United States Patent Office 2,987,501
Patented June 6, 1961

2,987,501
PROCESS FOR MAKING GRAFT COPOLYMERS OF POLYETHYLENE AND POLYPROPYLENE
James K. Rieke and Carl Moore, Midland, Mich., assignors to The Dow Chemical Company, Midland, Mich., a corporation of Delaware
No Drawing. Filed Nov. 5, 1958, Ser. No. 771,947
10 Claims. (Cl. 260—45.5)

This invention concerns a process for making graft copolymers of polyethylene and polypropylene. It relates more particularly to a method of creating "active" sites on the polymer chains of aliphatic olefin polymers and of reacting the activated olefin polymers with a monomer capable of addition polymerization to form graft copolymers.

Graft copolymers as is understood in the art constitute a trunk or base polymer having grafted-on polymer chains of a monomer capable of addition polymerization and may be represented by the formula:

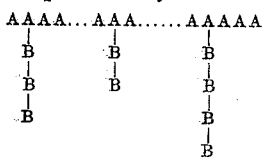

wherein A represents recurring units of the base or trunk polymer and B represents units of the polymer chains of the grafted-on monomer.

The graft copolymers possess unique properties and are different from copolymers prepared by polymerization of a mixture of monomers.

It is a primary object of the invention to provide a novel process for creating active sites on the polymer molecules of aliphatic olefin polymers such as polyethylene, polypropylene or copolymers of ethylene and propylene and of reacting the activated olefin polymers with a monomer capable of addition polymerization to form graft copolymers. Another object is to provide an integrated process for making graft copolymers of polyethylene and polypropylene.

According to the invention the foregoing and related objects are obtained by reacting or oxidizing a normally solid homopolymer of ethylene or propylene or copolymers of ethylene and propylene with nitrogen dioxide or fuming nitric acid at temperatures between 20° and 100° C. whereby active or oxidized sites are created on the polymer molecules and thereafter reacting the activated polymer with a monomer capable of addition polymerization whereby polymer chains of the monomer are graft-copolymerized onto the actived base polymer.

The olefin polymers to be employed in the process can be linear or branched chain polyethylene, polypropylene or copolymers of ethylene and propylene. The polymer can be in powder, granules, rod, strip, sheet, bars, film or other molded or shaped form.

The polymer can be activated or oxidized by treating it with gas such as $NO_2$ or $N_2O_4$ or a mixture thereof, or fuming nitric acid containing about 20 percent by weight of dissolved $NO_2$ at temperatures between 20° and 100° C., preferably from 40° to 90° C. and at atmospheric or substantially atmospheric pressure. The time for which the polymer is treated can be varied depending upon the number of active sites desired to be produced. A longer treatment at a given temperature will produce a greater number of active sites, and the number of active sites is increased with a raise in the treating temperature. The polymer should not be oxidized to such extent that appreciable deterioration occurs.

Monomers which can be graft-copolymerized onto the activated polymer are any vinyl or vinylidene compound which is capable of addition polymerization by free radical catalysts. Examples of suitable monomers are vinyl aromatic compounds such as styrene, vinyltoluene, vinylxylene, isopropylstyrene, tert.-butylstyrene, chlorostyrene, bromostyrene, dichlorostyrene, chlorovinyltoluene; esters of acrylic acid and methacrylic acid containing from one to four carbons in the alkyl group, acrylic acid, methacrylic acid, methyl isopropenyl ketone or acrylonitrile.

In practice the aliphatic olefin polymer, e.g. polyethylene, is treated with nitrogen dioxide or nitrogen tetraoxide gas or fuming nitric acid, containing at least 20 percent by weight of dissolved $NO_2$, at temperatures as hereinbefore stated until the polymer contains a desired degree of activation. Thereafter, the activated polymer is contacted with a monomer, suitably styrene, acrylonitrile or a lower alkyl ester of acrylic acid or methacrylic acid, or acrylic or methacrylic acid, in the liquid phase, and at temperatures between 50° and 150° C., or up to the boiling point of the monomer at 760 millimeters absolute pressure preferably between 60° and 100° C. whereby the active sites on the olefin polymer initiate the addition polymerization of the monomers with resultant formation of a graft copolymer consisting of the base polymer containing grafted-on polymer chains of the monomer.

The activated olefin polymer can be contacted with the liquid monomer by spraying, dipping, washing or by condensing vapors of the monomers on the activated polymer. Such contact of the monomer with the activated polymer is preferably carried out in the absence or substantial absence of air or oxygen. The activated polymer can be heated with the liquid monomer at atmospheric, subatmospheric or super-atmospheric pressure.

The graft copolymer can be recovered in usual ways, e.g. by decanting, filtering or centrifuging from the liquid. The product is purified or treated with a solvent for homopolymer which is usually formed to some extent in the graft copolymerization, which solvent is inert or merely swells the graft copolymer.

The following examples illustrate ways in which the principle of the invention has been applied, but are not to be construed as limiting its scope.

*Example 1*

Ten grams of powdered polyethylene having a melt index of 20 was suspended in 50 ml. of fuming nitric acid of specific gravity 1.49 and containing about 20 percent by weight of dissolved $NO_2$. The mixture was heated at temperatures between 65° and 75° C. for a period of 2 hours. The dispersion was poured into about 500 ml. of water. The polyethylene was separated by filtering and was washed with water. The damp polyethylene was placed in a glass bottle together with 50 ml. of monomeric acrylonitrile. The bottle was purged with nitrogen gas, then sealed. The bottle was placed in a water bath and the contents heated at 73° C. for a period of 22 hours. Thereafter, the bottle was removed and opened. The contents were washed out and the polymer separated by filtering and was washed and dried. There was obtained 52.21 grams of polymeric product. A 3 gram portion of the solid polymer was suspended in 300 ml. of dimethyl formamide with stirring at a temperature of 40° C. for 72 hours to extract homopolymer of acrylonitrile. The insoluble copolymer weighed 2.91 grams. This corresponds to a yield of 49.1 grams of graft copolymer. The graft copolymer contained 79.5 percent by weight of chemically combined acrylonitrile and 20.5 percent of polyethylene.

*Example 2*

A filament prepared from polyethylene having a melt index of 2, which filament had a diameter of 13 mils and weighed 0.5502 gram was immersed in fuming nitric acid, similar to that employed in Example 1, for 30 minutes at a temperature of 70° C., then was removed, washed with water and dried. It now weighed 0.5541 gram. The treated polyethylene filament was suspended above a body of boiling methyl methacrylate containing a polymerization inhibitor and being heated under refluxing conditions so that vapors of the methyl methacrylate condensed on the polyethylene filament. The polyethylene filament was maintained in contact with the condensing methyl methacrylate vapors for a period of 4 hours. It was removed and was immersed in methyl ethyl ketone at room temperature for 72 hours to extract homopolymer, then was removed from the methyl ethyl ketone and was washed and dried in a vacuum oven at 60° C. for a period of 16 hours.

The dried filament weighed 0.6697 gram. The product was a graft copolymer consisting of 17.3 percent by weight of methyl methacrylate chemically combined with 82.7 percent of polyethylene per 100 parts by weight of the graft copolymer.

*Example 3*

A film of about 2 mils thick prepared from polyethylene having a melt index of 2, which film weighed 0.9748 gram was exposed to a mixture of $NO_2$ and $N_2O_4$ gases at a temperature of 25° C. for a period of 0.5 hour. The treated film weighed 0.9773 gram. The treated film was immersed in 30 ml. of methyl methacrylate in a sealed tube and was maintained at a temperature of 70° C. for a period of 22 hours. It was then removed from the tube and extracted with methyl ethyl ketone to remove homopolymer of methyl methacrylate, then washed and dried. The dried film weighed 2.6001 grams. The product was a graft copolymer consisting of 62.4 percent by weight of polymethyl methacrylate and 37.6 percent polyethylene. The product has substantially greater stiffness than had the polyethylene film initially used.

The experiment was repeated except that the polyethylene film was treated with the mixture of gases for 0.5 hour at a temperature of 70° C. Similar results were obtained in that the graft copolymer was found to consist of 63.3 percent by weight of polymethyl methacrylate and 36.7 percent of polyethylene.

*Example 4*

A polypropylene monofilament 12 mils in diameter and weighing 0.3903 gram was immersed in fuming nitric acid similar to that employed in Example 1 for a period of 20 minutes at 70° C., then was removed, washed and dried. It now weighed 0.4090 gram. The treated polypropylene filament was immersed in 50 ml. of methyl methacrylate monomer and heated in a sealed tube at 70° C. for a period of 22 hours. It was then removed from the monomer and was extracted with methyl ethyl ketone and was washed and dried. The dried filament weighed 4.3410 grams. It was a graft copolymer of 91 percent by weight of polymethyl methacrylate and 9 percent of polypropylene. The graft copolymer filament had substantially greater stiffness than had the polypropylene filament initially used.

We claim:

1. A process for making a graft copolymer which comprises reacting a normally solid polymerized olefin selected from the group consisting of polyethylene and polypropylene with a nitrogen oxide selected from the group consisting of nitrogen dioxide of the formula $NO_2$, dinitrogen tetroxide of the formula $N_2O_4$ and mixtures thereof, at temperatures between 20° and 100° C., whereby reactive sites are produced on the polymer molecule, then reacting the so-treated polymer with a monomer selected from the group consisting of acrylonitrile, lower alkyl esters of methacrylic acid and lower alkyl esters of acrylic acid which esters contain from 1 to 4 carbon atoms in the alkyl group, by bringing the nitrogen oxide treated polyolefin into contact with the liquid monomer at temperatures between 50° and the boiling point of the monomer at 760 millimeters absolute pressure.

2. A process as claimed in claim 1, wherein the polymerized olefin is polyethylene.

3. A process as claimed in claim 1, wherein the polymerized olefin is polypropylene.

4. A process for making a graft copolymer which comprises reacting a normally solid polymerized olefin selected from the group consisting of polyethylene and polypropylene with $NO_2$ at temperatures between 20° and 100° C., whereby reactive sites are produced on the polymer molecule, then reacting the so-treated polymer with a vinylidene monomer, capable of addition polymerization by free radical catalysts, by bringing the $NO_2$ treated polymer into contact with the liquid monomer at temperatures between 50° and the boiling point of the monomer at 760 millimeters absolute pressure.

5. A process as claimed in claim 4, wherein the polymerized olefin is polyethylene.

6. A process as claimed in claim 4, wherein the polymerized olefin is polypropylene.

7. A process as claimed in claim 4, wherein the monomer is acrylonitrile.

8. A process as claimed in claim 4, wherein the monomer is methyl methacrylate.

9. A process as claimed in claim 8, wherein the polymerized olefin is polypropylene.

10. A process as claimed in claim 8, wherein the polymerized olefin is polyethylene.

References Cited in the file of this patent

UNITED STATES PATENTS 2,837,496    Vandenberg _____ June 3, 1958

FOREIGN PATENTS 1,161,824    France _____ Mar. 31, 1958

OTHER REFERENCES

Remy: "Treatise on Inorganic Chemistry," volume 1, pages 593 and 594, published by Elsevier, New York (1956).